Inventor
WILLIAM E. SIMPSON

Patented Oct. 17, 1922.

1,432,090

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

REDUCTION GEARING.

Application filed November 21, 1921. Serial No. 516,542.

*To all whom it may concern:*

Be it known that I, WILLIAM E. SIMPSON, a subject of the King of Great Britain and Ireland, residing at Detroit, in the county of Wayne and State of Michigan, have invented certain new and useful Improvements in Reduction Gearing, of which the following is a specification, reference being had therein to the accompanying drawings.

The invention relates to reduction gearing and has for its object the provision of reduction gearing which is very compact and in which the driven shaft is journalled in bearings at opposite ends of the gear housing. Another object of the invention is the provision of a construction in which the drive shaft has its axis substantially parallel to that of the driven shaft and may be rotatively adjusted relative to the housing and about the axis of the driven shaft. Further objects of the invention reside in the novel features of construction as more fully hereinafter set forth.

Figure 1:
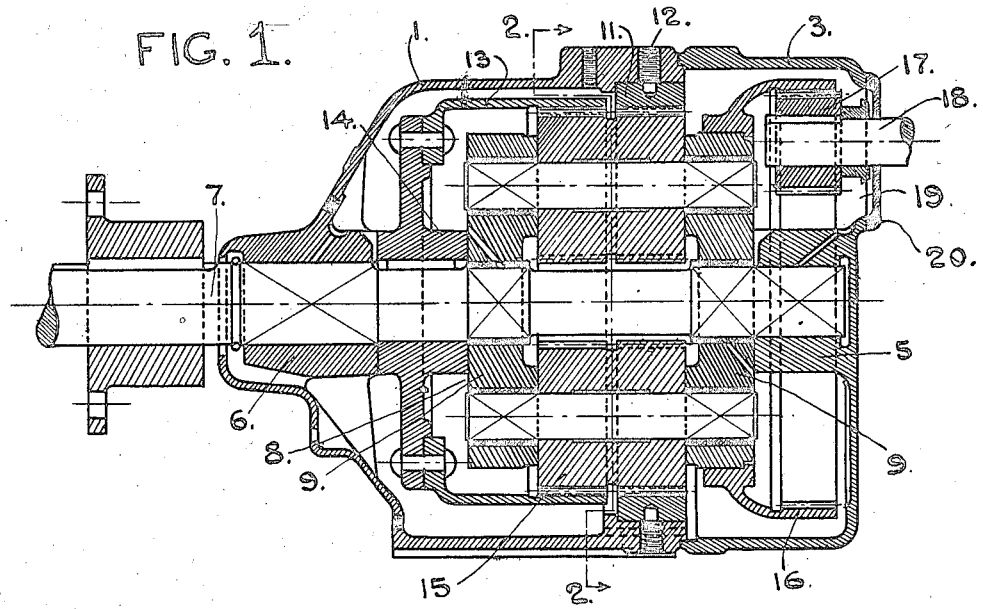
Figure 1 is a longitudinal section of a construction embodying my invention.
Figure 2:
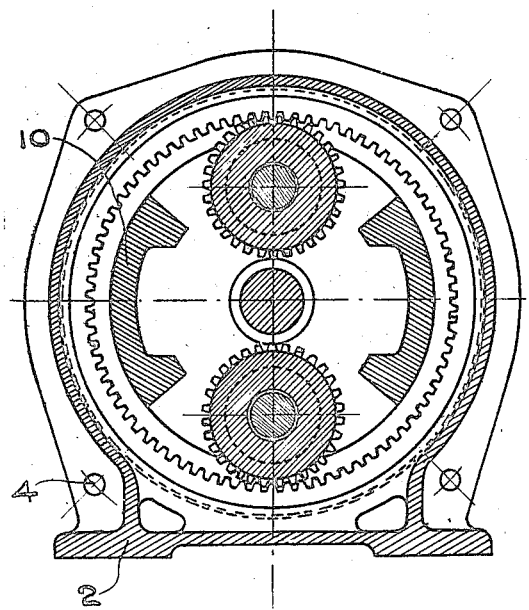
Figure 2 is a scross section on the line 2—2 of Figure 1.

1 is the main section of the housing having the base 2. 3 is the rotatively adjustable end section forming part of the housing and adapted to be secured to the main part 1 by suitable means such as the equidistant stud bolts 4. 5 is a bearing in the end section 3, and 6 is a bearing in the opposite end of the main section 1 and in alignment with the bearing 5. 7 is a driven shaft journalled in these bearings and extending outwardly beyond the bearing 6.

8 is a pinion cage having the ends 9 connected by the cross bars 10 preferably integral therewith, the ends 9 being journalled upon the driven shaft 7 intermediate the bearings 5 and 6. 11 is a stationary gear wheel secured to the main section 1 of the housing as by means of the dowel pins 12, and 13 is a rotatable gear wheel secured to the disk 14 keyed upon the driven shaft 7 between the bearing 6 and pinion cage 8. The rotatable gear wheel in the present instance has 79 teeth, while the stationary gear wheel has 80 teeth. 15 are planetary pinions journalled in the pinion cage 8 and meshing with the stationary and rotatable gear wheels 11 and 13 respectively, one of these planetary pinions having its teeth in line while the other has staggered teeth.

Figure 3:
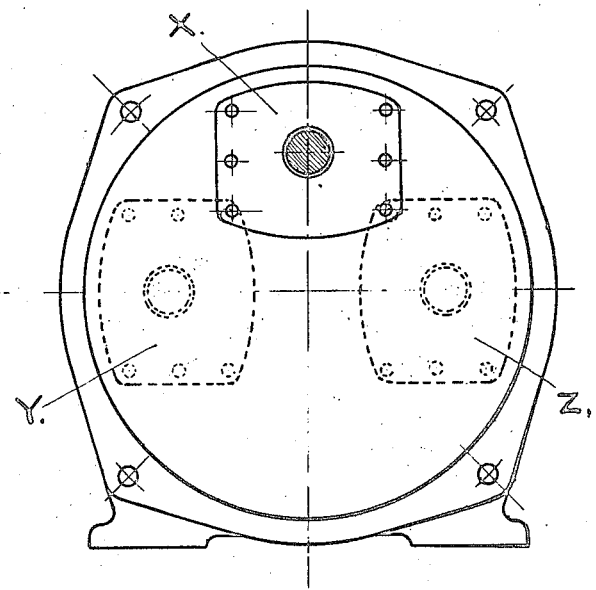
Figure 3 is an end view.

To rotate the pinion cage, I have provided the gear wheel 16 secured to one end 9 of the cage and overlying the bearing 5 and the pinion 17 upon the drive shaft 18 which extends through the end section 3 and into the housing and has its axis parallel to that of the driven shaft. The end section has the opening 19 therethrough which is adapted to be closed by the cover 20 detachably secured thereto and having an opening for the drive shaft. In the event that there are any obstructions or the like which might prevent extending the drive shaft into the gear housing in a certain position, the end section 3 may be detached from the main section 1 of the housing and rotated through a quarter turn in the present instance, thereby changing the position of the drive shaft relative to the housing. As shown in Figure 3 particularly, the drive shaft is adapted to occupy three different positions indicated respectively by the full line X and dotted lines Y, Z.

From the above description it will be readily seen that I have provided a compact construction of reduction gearing and one in which the drive shaft and driven shaft are substantially parallel and the drive shaft may be rotatably adjusted in the gear housing about the driven shaft. Furthermore, the arrangement is such that various sizes of pinion upon the drive shaft and of intermeshing gear wheel for driving the pinion cage may be used.

What I claim as my invention is:

1. The combination with a gear housing, of a drive shaft, a driven shaft journalled in a pair of bearings in said housing, the axes of said shafts being substantially parallel, a pinion cage journalled upon said driven shaft, a stationary internal gear wheel secured to said housing, a second internal gear wheel connected to said driven shaft, and a planetary pinion upon said cage engaging said gear wheels, and means for rotating said cage.

2. The combination with a gear housing, of a driven shaft journalled within said housing, a planetary gearing within said housing for driving said driven shaft, and a drive shaft extending into said housing and connected to said planetary gearing, said drive shaft being adapted to occupy various positions of rotative adjustment about the axis of said driven shaft.

3. The combination with a gear housing, of a driven shaft journalled within said housing, planetary gearing within said housing for driving said driven shaft, a drive shaft having its axis substantially parallel to that of said driven shaft extending into said housing, a driving connection between said drive shaft and planetary gearing, and means for rotatively adjusting said drive shaft relative to said housing and about the axis of said driven shaft, said driving connection being operable in each position of rotative adjustment.

4. The combination with a gear housing, of a driven shaft journalled within said housing, a pinion cage journalled upon said driven shaft, a stationary internal gear wheel upon said housing, a second internal gear wheel connected to said driven shaft, a planetary pinion upon said cage and engaging said gear wheels, a gear wheel secured to said cage, a drive shaft having its axis substantially parallel to that of said driven shaft, said drive shaft being adapted to occupy various positions of rotative adjustment relative to said housing and about the axis of said driven shaft, and a pinion upon said drive shaft engaging said gear wheel upon said cage.

5. The combination with a housing main section having a bearing and a relatively rotatable housing end section having a bearing in alignment with said first-mentioned bearing, of a driven shaft journalled in said bearings, a pinion cage journalled upon said driven shaft between said bearings, a stationary gear wheel upon said housing, a rotatable gear wheel secured to said driven shaft, a planetary pinion upon said cage and engaging said gear wheels, a gear wheel secured to said cage, a drive shaft extending through said end section, and a pinion upon said drive shaft engaging said gear wheel secured to said cage.

In testimony whereof I affix my signature.

WILLIAM E. SIMPSON.